(12) United States Patent
Warnecke et al.

(10) Patent No.: US 6,318,752 B1
(45) Date of Patent: Nov. 20, 2001

(54) INSTRUMENT PANEL FOR A MOTOR VEHICLE

(75) Inventors: Frank Warnecke, Karlsruhe; Günter Grübler, Kelsterbach; Thomas Kunkel, Ludwigshafen; Andreas Flick, Kandel, all of (DE)

(73) Assignee: Sommer Allibert-Lignotock GmbH (DE)

( * ) Notice: Subject to any disclaimer, the term of this patent is extended or adjusted under 35 U.S.C. 154(b) by 0 days.

(21) Appl. No.: 09/646,520
(22) PCT Filed: Mar. 12, 1999
(86) PCT No.: PCT/EP99/01709
§ 371 Date: Nov. 20, 2000
§ 102(e) Date: Nov. 20, 2000
(87) PCT Pub. No.: WO99/47386
PCT Pub. Date: Sep. 23, 1999

(30) Foreign Application Priority Data

Mar. 16, 1998 (DE) ............................. 298 05 295 U

(51) Int. Cl.[7] .................................................. B60R 21/16
(52) U.S. Cl. ........................................ 280/728.3; 280/732
(58) Field of Search .............................. 280/728.1, 728.3, 280/731, 732

(56) References Cited

U.S. PATENT DOCUMENTS

| | | |
|---|---|---|
| 5,110,647 * | 5/1992 | Sawada et al. . |
| 5,158,322 * | 10/1992 | Sun . |
| 5,335,939 * | 8/1994 | Kuriyama et al. . |
| 5,375,876 | 12/1994 | Bauer et al. . |
| 5,407,225 * | 4/1995 | Cooper . |
| 5,478,106 * | 12/1995 | Bauer et al. . |
| 5,685,930 | 11/1997 | Gallagher et al. . |
| 5,865,461 | 2/1999 | Totani et al. . |
| 6,129,378 * | 10/2000 | Goto et al. . |

FOREIGN PATENT DOCUMENTS

WO 97/03866   2/1997   (WO) .

* cited by examiner

*Primary Examiner*—Paul N. Dickson
(74) *Attorney, Agent, or Firm*—Young & Basile, P.C.

(57) ABSTRACT

The invention relates to an instrument panel for motor vehicles, made of a thermoplastic material and providing an invisible cover for an airbag system which, as seen from the inside of the motor vehicle, is positioned behind the instrument panel (rear side). The instrument panel is characterized in that it has a weakened section on the rear side which defines an opening area in the instrument panel for the airbag and fully surrounds said opening area, and in that it has an ejection channel for the airbag fixed to it. The opening area in the instrument panel designed for the airbag is connected with the ejection channel by means of a polymer hinge. Both the ejection channel and the polymer hinge are fixed at least to the opening area of the instrument panel designed for the air bag by means of a welded material. The instrument panel, ejection channel and polymer hinge are made of a thermoplastic material having the same polymer basis but flexibilized in different ways.

10 Claims, 1 Drawing Sheet

INSTRUMENT PANEL FOR A MOTOR VEHICLE

The invention relates to an instrument panel made from thermoplastic material for a motor vehicle, having an invensible cover for an airbag system which as seen from the interior of the motor vehicle, is arranged behind the instrument panel.

BACKGROUND OF THE INVENTION

In the following text, the term "instrument panel" is to be understood as meaning a shell structure which defines the visible side of a vehicle cockpit and generally bears control elements and display instruments. Vehicle cockpits with corresponding instrument panels are described, for example, in DE 34 47 185 A1 and EP 0 515 287 A1. In this prior art, the instrument panels comprise a supporting, dimensionally stable carrier part which, on the visible side, is generally laminated with a decorative plastic film. It is also customary to lay a foam cushion beneath the decorative film of the lamination, over the entire surface or in some areas, in order to achieve a pleasant handle (feel). The carrier parts are manufactured from different materials: rigid foam shells with a foamed-on lamination, injection-molded thermoplastic shells and shaped wood fiber parts are usual.

Since the introduction of the airbag, the instrument panel has had the additional role of covering the passenger airbag in a visually appealing form without limiting its function. There is an increasing demand for the airbag system to be impossible to pick out on the visible side of the instrument panel (so-called "invisible" airbag). For this purpose, the instrument panels have a U-shaped or H-shaped notch on the rear side in the opening area of the airbag, so that the expanding airbag can open one or two flaps. In this arrangement, either the material of the carrier part itself and/or a separately arranged component serves as a "plastic hinge". By way of example, please refer to DE 36 11 468 A1. The airbag system also includes a guide connection piece for the expanding airbag, the so-called ejection channel, which is usually a separate component which may be prefitted on the instrument panel. Manufacturing instrument panels as a thermoplastic injection molding makes it possible, with simple vehicle equipment, to dispense with lamination of the instrument panels, for example in favor of surface structuring (leather grain effect or the like). However, with unlaminated instrument panels there are difficulties with attaching additional elements, for example with prefitting an ejection channel for the airbag. Only those joining processes which do not form a disruptive presence on the visible side (adhesive bonding, welding) are suitable, thus limiting design and manufacturing options. In addition, a very wide range of requirements are imposed on the material properties of the instrument panel itself, of the ejection channel and the opening area for the invisible airbag. The instrument panel should not become brittle at cold temperatures, but should remain dimensionally stable at elevated interior temperatures; the material must therefore not be excessively flexible, while there are no excessively great demands placed on its tensile strength. On the other hand, the hinge area of the opening flaps of the invisible airbag system should be as flexible as possible, so as to be able to fulfill the appropriate function. The ejection channel should have a high strength and be rigid. The moduli of elasticity, the elongation at break and the tensile strength of said elements of an instrument panel with an invisible airbag are therefore required to differ greatly. In practice, materials which also differ are used, but this has the drawback of making recycling more difficult and more expensive. Furthermore, the lack of uniformity of the materials makes it more difficult to use unlaminated instrument panels, in which joining components using rivets or screws on the visible side is undesirable, even though the manufacture of thermoplastic injection moldings is economically beneficial and leaves a great deal of design freedom.

SUMMARY OF THE INVENTION

Therefore, the invention is based on the object of providing an instrument panel made from a thermoplastic material which makes it easy to fit an invisible airbag and which can be recycled more easily.

This object is achieved by means of the features described hereinafter, including specified advantageous refinements of the instrument panel according to the invention.

By providing a rear-side cross-sectional weakening in the instrument panel, weakening which defines an opening area in the instrument panel for the airbag and completely surrounds the opening area, i.e. a continuous desired breaking location, which does not come into view on the visible side, the opening area of the airbag is thrown off completely, as a cover, when the airbag is actuated. This has two advantages:

The material of the instrument panel does not have to be adapted to properties of a plastic hinge, but rather may be of the rigidity which is required to achieve dimensional stability under hot conditions.

The risk which is present in conventional instrument panels with a U-shaped and H-shaped weakening, that uncontrolled cracks in the instrument panels will start from the ends of the weakened section, is no longer present.

An ejection channel which is prefitted on the instrument panel not only facilitates overall assembly of the instrument panel, but also makes it possible to securely attach the opening area, which can be thrown off as a cover, of the instrument panel for the airbag with the aid of a large-area integral polymer hinge (i.e. a plastic hinge). Prefitting the ejection channel and securing the integral polymer hinge to the "opening cover" of the instrument panel with the aid of large-area welded material ensures an unblemished visible side of the instrument panel, since in both cases the welding takes place on its rear side. The integral polymer hinge does not necessarily have to be attached to the ejection channel exclusively by means of welded material; for example, it may be expedient to use screws and/or rivets as additional securing means; since the ejection channel is arranged on the rear side, there is no effect on the visible side. To achieve a secure welded joint, according to the invention, the instrument panel, ejection channel and integral polymer hinge comprise a thermoplastic of the same polymer base, but differently flexibilized. The uniform polymer base ensures that all the components can be welded together without problems, while the possibility of different degrees of flexibilization by compound formation (chemical combination of materials, copolymer) make it possible to provide the integral polymer hinge with an elongation at break of up to, for example, 300% and thus to reliably prevent the "opening cover" from tearing off. An adapted mineral filling of the thermoplastic matrix makes it possible to produce the required dimensional stability of the instrument panel under hot conditions; in the case of the ejection channel, which is the component which is subject to the highest mechanical loads when the airbag is triggered, a fiber reinforcement provides the increased strength given a low level of flexibilization of the base polymer. A suitable polymer base is, for example, polypropylene, which has an advantageous price to properties ratio; for the copolymer formation for flexibilization purposes, the prior art offers sufficient possible options; one example which may be mentioned is ethylene/polypropylene diene (EPDM). While for the integral polymer hinge it is possible to achieve elongations at break of up to 300% by means of flexibilization, the level of flexibilization of the instrument panel itself is lower; in this case, the flexibilization should be just sufficient to avoid brittle fractures at low temperatures (winter temperatures). For this purpose, the thermoplastic of the instrument panel may contain a mineral filling, for example talc, of 15–20% by weight, in order to ensure dimensional stability under hot conditions. Like the instrument panel, the material of the ejection channel has an equally low level of flexiblization, the strength of which channel is increased even further by incorporating fibers, for example glass fibers, in an amount of 15–30% by weight. The strength of the integral polymer hinge can be increased by means of a fiber insert; by way of example, strong-edged, weldably clad polyester fabrics are suitable for this purpose.

Various welding techniques can be used to weld the components together. Ultrasonic, frictional, vibration and laser welding may be mentioned, the first three of which techniques are advantageous in terms of manufacturing technology, since the energy input is mechanical. Large-area welds can be optimized if one of the surfaces to be welded has a multiplicity of welding webs or welding projections distributed over the surface. In particular, the welding of the integral polymer hinge to the cover, which can be thrown off, of the instrument panel can be optimized in this way. The continuous cross-sectional weakening of the instrument panel may, for example, be a notch on the rear side. However, there is then the risk that the notch will in fact become noticeable on the visible side over the course of time. It is more advantageous to produce the cross-sectional weakening by forming it from a closely packed sequence of blind bores with a small diameter which may be produced, for example, using laser beams, a process which is described in DE 196 36 429 A1, which has already gained acceptance in manufacturing technology. In this way, it is possible to produce tear-off seams (cross-sectional weakenings) which are not noticeable on the treated surface (visible side) and have a defined breaking strength.

The present instrument panel is preferably not laminated on the visible side. In an embodiment of this type, it is advantageous if the visible side of the instrument panel has a surface structure, for example a leather grain effect. Such structures can be produced without problems during manufacture by injection molding and optically enhance the molding considerably. Grained surfaces may also be used to improve the appearance. Leather grain effects have the additional advantage that there is no distortion of the pattern compared to film lamination.

However, the present instrument panel may also be laminated. If a perfect opening of the covering is to be ensured when the airbag is triggered, this requires the lamination in the opening area to have a rear-side cross-sectional weakening which is congruent with the cross-sectional weakening of the instrument panel. Since the laser perforation process described in DE 196 36 429 A1 is also suitable for the joint perforation of a multilayer arrangement, it is even possible to use foam-backed films for lamination.

The invention will now be explained in more detail with reference to the exemplary embodiment illustrated in FIGS. 1 and 2.

DETAILED DESCRIPTION OF THE PREFERRED EMBODIMENT

Figure 1:
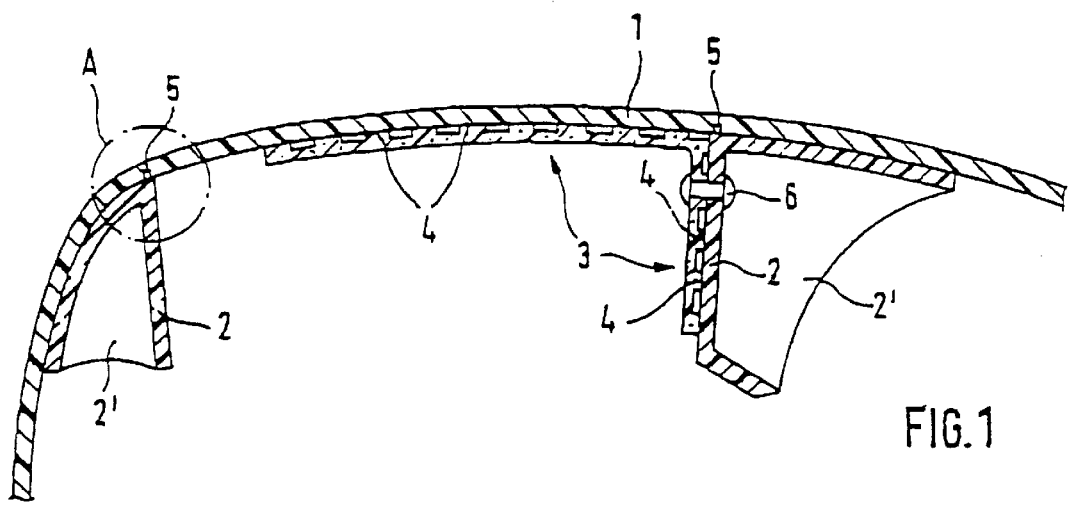
FIG. 1 shows a diagrammatic cross section through an instrument panel with a prefitted ejection channel and integral polymer hinge.
Figure 2:
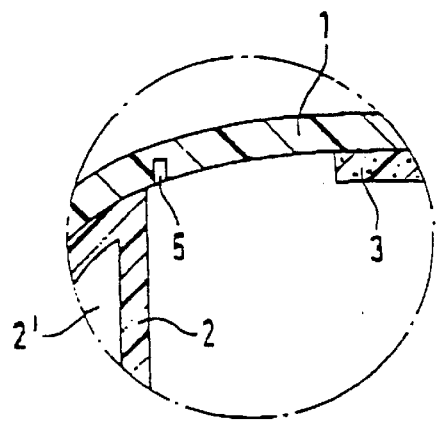
FIG. 2 shows an enlarged view of the area A from FIG. 1.

In FIG. 1, 1 denotes the instrument panel, and 2 denotes the ejection channel. Both elements comprise EPDM-flexibilized polypropylene, the instrument panel 1 being filled with 20% by weight talc and the ejection channel 2 being reinforced with, for example, 30% short glass fibers. The large-area integral polymer hinge 3 is a compound of polypropylene with ethylene/butylene, a material with thermoplastic properties. The ejection channel 2 is mechanically strengthened by the reinforcement ribs 2', in order to be able to effectively withstand the mechanical loads imposed by the expanding airbag (the airbag unit is not shown in FIG. 1). The integral polymer hinge 3 has welding webs 4 which allow large-area welding. These welding webs 4 on the one hand reduce the size of the welding area to a level which can be managed in terms of welding technology (for example during vibration welding), and on the other hand enable the integral polymer hinge to be joined to the instrument panel and the ejection channel over the entire area. A series of rivets 6 enables the connecting surface between the angled-off limb of the integral polymer hinge 3 and the ejection channel 2 to be protected against peeling stresses. The opening area of the instrument panel for the airbag to pass through is defined by the cross-sectional weakening 5, which comprises a series of blind bores of small diameter which have been made with the aid of laser beams. The frequency and depth of these holes specify a defined tear seam and ensure that the opening cover is thrown off in a defined, faultless manner. In FIG. 2, this cross-sectional weakening 5 is explained with reference to the enlarged excerpt A from FIG. 1, with the components being given the same designations.

What is claimed is:

1. Instrument panel made from thermoplastic material, for a motor vehicle, having an invisible cover for an airbag system which, as seen from the interior of the motor vehicle, is arranged behind the instrument panel, characterized by a rear-side cross-sectional weakening in the instrument panel, said weakening defines an opening area in the instrument panel for the airbag and completely surrounds the opening area, an ejection channel for the airbag, which is fitted on the instrument panel, the opening area in the instrument panel for the airbag being connected to the ejection channel by means of an integral polymer hinge, and both the ejection channel on the instrument panel and the integral polymer hinge being attached at least to the opening area in the instrument panel for the airbag by means of welded material, and the instrument panel, ejection channel and integral polymer hinge comprising a thermoplastic of the same polymer base, but differently flexibilized.

2. Instrument panel according to claim 1, characterized in that the polymer base for the instrument panel, ejection channel and integral polymer hinge is polypropylene.

3. Instrument panel according to claim 1, characterized in that the material of the instrument panel additionally comprises a mineral filling of 15–20% by weight talc, in order to set the flexibilization.

4. Instrument panel according to claim 1, characterized in that the material of the ejection channel is only slightly flexibilized and has a mineral fiber reinforcement of 15–30% by weight glass fibers.

5. Instrument panel according to claim 1, characterized in that the material of the integral polymer hinge is highly flexibilized and has an elongation at break of more than 200%.

6. Instrument panel according to claim 1, characterized in that the integral polymer hinge has a fabric insert.

7. Instrument panel according to claim 1, characterized in that the integral polymer hinge has a multiplicity of welding webs distributed over the surface for connection to at least one of the opening area and ejection channel.

8. Instrument panel according to claim 1, characterized in that the cross-sectional weakening of the instrument panel, which defines the opening area of the airbag, comprises a closely packed sequence of blind bores with a small diameter.

9. Instrument panel according to claim 1, characterized in that the instrument panel is not laminated and has a surface structure on the visible side.

10. Instrument panel according to claims 1, characterized in that the instrument panel is laminated on the visible side, and the lamination has a rear-side cross-sectional weakening which is congruent with the cross-sectional weakening of the instrument panel which defines the opening area.

* * * * *